(12) United States Patent
Deppe et al.

(10) Patent No.: US 9,564,824 B2
(45) Date of Patent: Feb. 7, 2017

(54) CONVERTER FOR SUPPLYING PULSED POWER TO LIGHT SOURCE

(75) Inventors: Carsten Deppe, Aachen (DE); Reinhold Elferich, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 357 days.

(21) Appl. No.: 13/203,338

(22) PCT Filed: Feb. 23, 2010

(86) PCT No.: PCT/IB2010/050778
§ 371 (c)(1),
(2), (4) Date: Aug. 25, 2011

(87) PCT Pub. No.: WO2010/097752
PCT Pub. Date: Sep. 2, 2010

(65) Prior Publication Data
US 2011/0309762 A1    Dec. 22, 2011

(30) Foreign Application Priority Data
Feb. 26, 2009   (EP) .................................... 09153753

(51) Int. Cl.
*H05B 33/08* (2006.01)
*H02M 3/337* (2006.01)
*H02M 1/00* (2006.01)

(52) U.S. Cl.
CPC ......... *H02M 3/337* (2013.01); *H05B 33/0818* (2013.01); *H02M 2001/0058* (2013.01); *Y02B 20/346* (2013.01); *Y02B 70/1491* (2013.01)

(58) Field of Classification Search
CPC ............ H05B 33/0815; H05B 33/0818; H05B 33/0884; H05B 33/0809; H02M 3/337
(Continued)

(56) References Cited

U.S. PATENT DOCUMENTS 6,534,928 B1   3/2003   Li et al.
7,999,484 B2   8/2011   Jurngwirth et al.
(Continued)

FOREIGN PATENT DOCUMENTS

DE   102006035071 A1   1/2008
DE   102006036167 A1   2/2008
(Continued)

*Primary Examiner* — Douglas W Owens
*Assistant Examiner* — Syed M Kaiser

(57) ABSTRACT

Converters (1) for supplying pulsed power to light sources (8) comprise switching parts (2) and controlling parts (3) for adapting switching parameters of the switching parts (2) for improving a performance. The switching part (2) may comprise first/second switches (41, 42) that are in first/second modes during a first time interval of a cycle and vice versa during a second time intervals of a cycle. A group of cycles results in a pulse of the pulsed power. A switching parameter such as the first time interval of a first cycle may be shortened to reduce overshoot. A switching parameter such as the second time interval of the first cycle may be shortened or lengthened. A switching parameter such as the second time interval of a last cycle may be lengthened or shortened to reduce overshoot. A third switch (93) for switching the light source (8) is activated and de-activated delayedly to improve transient behavior.

12 Claims, 11 Drawing Sheets

(58) Field of Classification Search
USPC .................................. 315/219, 209 R, 224
See application file for complete search history.

(56) References Cited

U.S. PATENT DOCUMENTS

| | | | | |
|---|---|---|---|---|
| 8,988,902 | B2* | 3/2015 | Gao | H02M 3/33523 |
| | | | | 363/19 |
| 2007/0165426 | A1* | 7/2007 | Kyono | H02M 3/337 |
| | | | | 363/21.02 |
| 2007/0297199 | A1* | 12/2007 | Sauerlander | H02M 3/3382 |
| | | | | 363/21.02 |
| 2008/0084167 | A1* | 4/2008 | Waffenschmidt | H02M 3/337 |
| | | | | 315/210 |

FOREIGN PATENT DOCUMENTS

| | | | |
|---|---|---|---|
| EP | 1973175 | A1 | 9/2008 |
| WO | 2006056960 | A1 | 6/2006 |
| WO | 2007102106 | A2 | 9/2007 |
| WO | 2007112823 | A2 | 10/2007 |
| WO | 2007141676 | A1 | 12/2007 |
| WO | 2007148271 | A1 | 12/2007 |
| WO | 2008029325 | A1 | 3/2008 |
| WO | 2008068684 | A2 | 6/2008 |
| WO | 2008104919 | A1 | 9/2008 |
| WO | 2008110978 | A1 | 9/2008 |
| WO | 2008110990 | A1 | 9/2008 |

* cited by examiner

CONVERTER FOR SUPPLYING PULSED POWER TO LIGHT SOURCE

FIELD OF THE INVENTION

The invention relates to a converter for supplying pulsed power to a light source, and also relates to a device comprising a converter and to a method.

Examples of such a light source are Light Amplification by Stimulated Emission of Radiation (LASER) sources and Light Emitting Diode (LED) sources. Examples of such a device are consumer products and non-consumer products such as industrial products.

BACKGROUND OF THE INVENTION

US 2007/0297199 discloses a multi resonance converter. This converter has semi-conductor switches that are controlled alternately, whereby in an upper range of the drawn power, a frequency is controlled, and in a lower range of the drawn power, a mark-space ratio is controlled.

SUMMARY OF THE INVENTION

It is an object of the invention to provide a converter, a device and a method having an improved performance.

A first aspect of the invention relates to a converter for supplying pulsed power to a light source, the converter comprising a switching part and a controlling part for controlling the switching part, the controlling part being arranged for adapting a switching parameter of the switching part for improving a performance of the converter.

By adapting a switching parameter of the switching part, a performance of the converter can be improved. The switching parameter is for example a timing parameter that for example defines a time interval or a moment in time.

An embodiment defines the switching part comprising first and second switches, the first switch being in a first mode and the second switch being in a second mode during a first time interval of a cycle, the first switch being in the second mode and the second switch being in the first mode during a second time interval of the cycle, a group of cycles resulting in a pulse of the pulsed power. The first and second switches may comprise semi-conductor switches such as a transistor or a thyristor etc. and may comprise mechanical switches such as a relay etc. The first mode may comprise an activation mode such as a conducting mode etc. and the second mode may comprise a de-activation mode such as a non-conducting mode etc. without having excluded other exemplary modes. Each cycle comprises first and second time intervals. During the first time interval, the switching part supplies a first output value, and during the second time interval, the switching part supplies a second output value different from the first output value. Before the first time interval, between the first and second time intervals, and after the second time interval, one or more other time intervals may be present or not (per cycle).

An embodiment defines the switching parameter comprising the first time interval of the first cycle of the group of cycles, and said adapting comprising shortening the first time interval of the first cycle. A shortened first time interval of the first cycle results in the pulse of the pulsed power having a reduced overshoot.

An embodiment defines the switching parameter further comprising the second time interval of the first cycle of the group of cycles, and said adapting further comprising shortening or lengthening the second time interval of the first cycle. A shortened or lengthened second time interval of the first cycle can further improve a pulse performance and a lengthened second time interval of the first cycle may result in the first cycle having a same duration as other cycles of the group of cycles.

An embodiment defines the switching parameter comprising the second time interval of the last cycle of the group of cycles, and said adapting further comprising lengthening or shortening the second time interval of the last cycle. A lengthened or shortened second time interval of the last cycle results in the pulse of the pulsed power having a reduced overshoot.

An embodiment defines the converter generating a peak signal during a third time interval following the last cycle, which third time interval is shorter than the shortened first time interval. The peak signal following the last cycle during a third time interval that is shorter than the shortened first time interval results from the resonant current in the converter.

An embodiment defines the first switch comprising a first main electrode coupled to a first input terminal of the converter, the second switch comprising a first main electrode coupled to a second main electrode of the first switch, the second switch comprising a second main electrode coupled to a second input terminal of the converter, control electrodes of the first and second switches being coupled to the controlling part, the first and second main electrodes of one of the switches being coupled to first and second terminals of a primary winding of a transformer, a first terminal of a secondary winding of the transformer being coupled to a first output terminal of the converter, a second terminal of the secondary winding being coupled to a second output terminal of the converter, a first terminal of a further secondary winding of the transformer being coupled to the second output terminal, and a second terminal of the further secondary winding being coupled to the first output terminal. At least one of the main electrodes of one of the switches is coupled to at least one of the terminals of the primary winding of the transformer via at least one capacitor, also called resonant capacitor.

An embodiment defines the converter comprising a filter coupled to first and second output terminals of the converter. This converter has an improved transient behavior (steep pulse edges).

An embodiment defines the switching part further comprising a third switch for switching at least one of first and second output terminals of the converter, the switching parameter comprising a first moment in time, the third switch being brought into the first mode at the first moment in time, which first moment in time is situated at a first delay from a start of the first cycle, the switching parameter further comprising a second moment in time, the third switch being brought into the second mode at the second moment in time, which second moment in time is situated at a second delay from an end of a last cycle of the group of cycles. The third switch is activated some time (first delay) after the start of the first cycle and is de-activated some time (second delay) after the end of the last cycle. This converter has an extremely improved transient behavior (steep pulse edges).

An embodiment defines the controlling part comprising a controller for controlling the first and second and third switches. In this converter, the first and second and third switches are controlled from a primary side.

An embodiment defines the controlling part comprising a detector for controlling the third switch in response to a detection of a voltage signal of the converter. In this converter, the first and second switches are controlled from a primary side and third switch is controlled from a secondary side.

An embodiment defines the controlling part providing a constant power output via indirect measurements obtained at a primary side of the converter through a so called "charge mode control" for measuring a current and/or through a shunt resistor at the primary side and/or through measurements already acquired before.

An embodiment defines the controlling part providing a false condition detection and protection from indirect measurements through a short circuit detection by measuring an input power going to near zero and/or through load failures in the form of too high or too low load voltages by measuring an input power being situated outside an expected range that depends on a converter input voltage and an actual switching frequency, taken from a look up table or otherwise.

A second aspect of the invention relates to a device comprising the converter and further comprising the light source.

A third aspect of the invention relates to a method for supplying pulsed power to a light source via a converter comprising a switching part and a controlling part for controlling the switching part, the method comprising a step of, via the controlling part, adapting a switching parameter of the switching part for improving a performance of the converter.

Embodiments of the device and of the method correspond with the embodiments of the converter.

In US 2007/0297199 a switching parameter is used to control an output power of the converter. According to the invention, a switching parameter is to be adapted for improving a performance of the converter, whereby the output power per pulse should be relatively constant.

An insight might be that a performance of a converter can be improved by minimizing overshoot and/or optimizing transient behavior. Overshoot reduces lifetime and slow transient behavior reduces efficiency, for example for LASER/LED sources.

A basic idea might be that a performance of a converter is to be improved by adapting a switching parameter.

A problem to provide a converter having an improved performance has been solved.

A further advantage is that a performance of a converter has been improved at low costs.

These and other aspects of the invention are apparent from and will be elucidated with reference to the embodiment(s) described hereinafter.

DETAILED DESCRIPTION OF EMBODIMENTS

Figure 1:
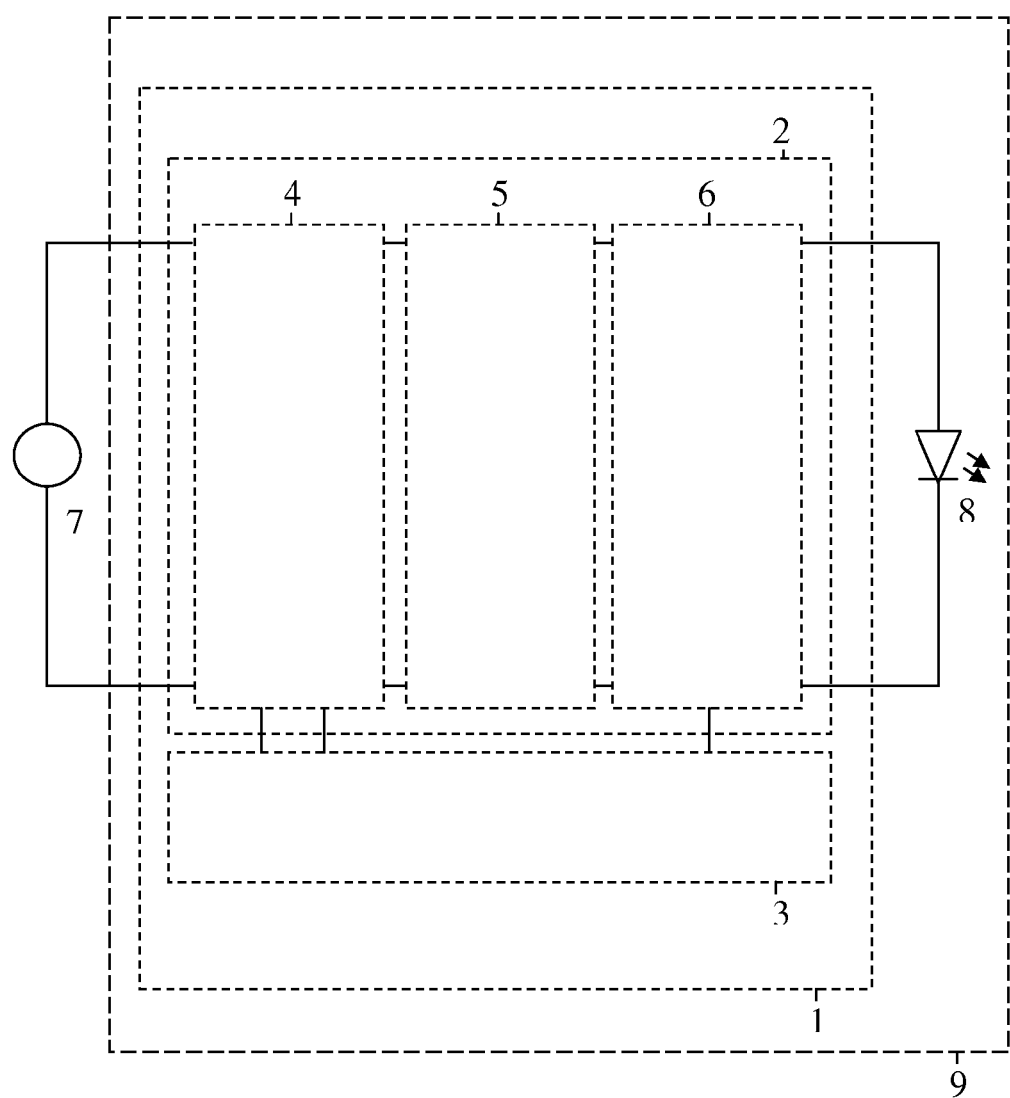
FIG. 1 shows a device comprising a converter, the converter comprising a switching part and a controlling part.

In the FIG. 1, a device 9 is shown comprising a converter 1. The converter 1 comprises a switching part 2 and a controlling part 3. The switching part 2 comprises an input part 4 coupled to a source 7, a transforming part 5 coupled to the input part 4, and an output part 6 coupled to the transforming part 5 and coupled to a light source 8. The light source 8 comprises for example one or more Light Amplification by Stimulated Emission of Radiation (LASER) sources and/or one or more Light Emitting Diode (LED) sources.

Figure 2:
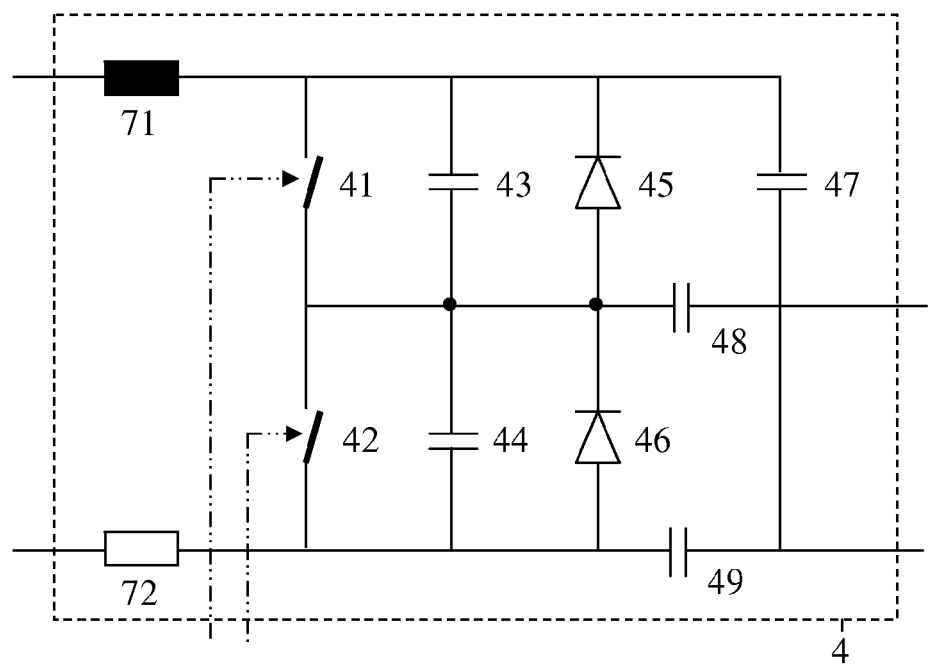
FIG. 2 shows an input part of the switching part.

In the FIG. 2, the input part 4 is shown in greater detail. The input part 4 comprises an inductor 71 coupled between a positive terminal of the source 7 and a first main electrode of a first switch 41 and one side of a capacitor 43, a diode 45 and a capacitor 47. A second main electrode of the first switch 41 is coupled to a first main electrode of a second switch 42 and to the other side of the capacitor 43 and the diode 45 and to one side of a capacitor 44, a diode 46 and a capacitor 48. The input part 4 further comprises a resistor 72 coupled between a negative terminal of the source 7 and a second main electrode of the second switch 42 and the other side of the capacitor 44 and the diode 46 and one side of a capacitor 49. The other side of the capacitor 47 is coupled to the other side of the capacitor 49, and the other sides of the capacitors 48 and 49 are to be coupled to the transforming part 5. The inductor 71 builds a high frequency filter together with the capacitors 47 and 49 to smooth current. Capacitors 43 and 44 limit a speed of a voltage commutation when the switches 41 and 42 are open. Sometimes these capacitors 43 and 44 can be omitted if an internal capacity of the switches 41 and 42 is sufficient. In case the switches 41 and 42 are MOSFETs, the diodes 45 and 46 form part of these MOSFETs. The resistor 72 can be left out in case no current measurement is required or in case current measurement is performed by a charge mode.

Figure 3:
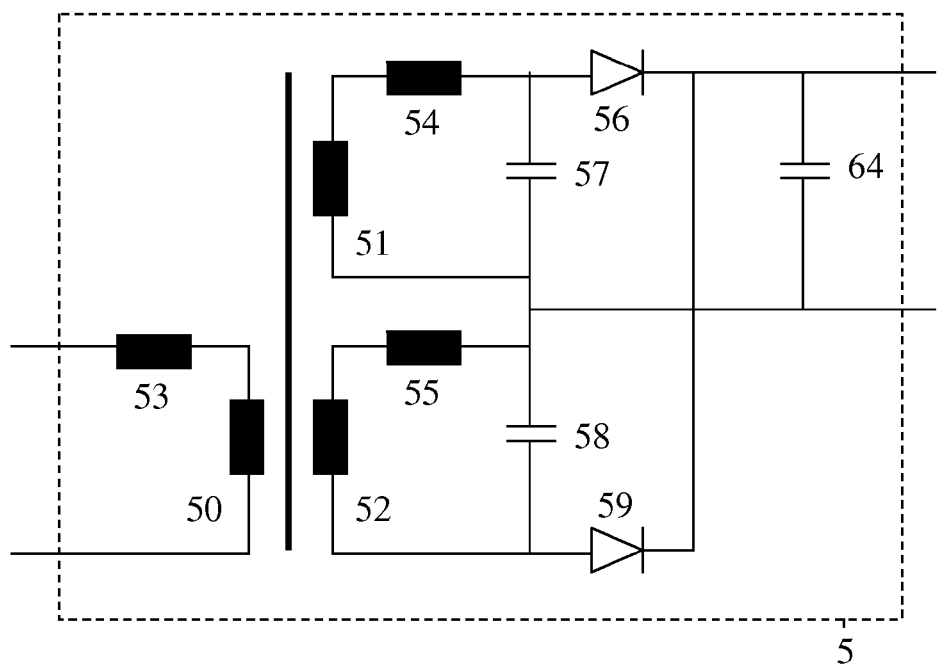
FIG. 3 shows a transforming part of the switching part.

In the FIG. 3, the transforming part 5 is shown in greater detail. The transforming part 5 comprises a transformer with a primary winding 50. One terminal of the primary winding 50 is coupled to the other side of the capacitor 49 and the other terminal is coupled via an inductor 53 to the other side of the capacitor 48. One terminal of a secondary winding 51 of the transformer is coupled via an inductor 54 to one side of a diode 56 and a capacitor 57, and the other terminal is coupled to the other side of the capacitor 57. One terminal of a further secondary winding 52 of the transformer is coupled via an inductor 55 to the other side of the capacitor 57 and to one side of a capacitor 58, and the other terminal is coupled to the other side of the capacitor 58 and to one side of a diode 59. Other sides of the diodes 56 and 59 are coupled to each other, and these other sides are, together with the other terminal of the secondary winding 51, to be coupled to the output part 6. A capacitor 64 is present between these other sides and the other terminal of the secondary winding 51. Inductors 53-55 and capacitors 57-58 may form part of the transformer or not.

Figure 4:
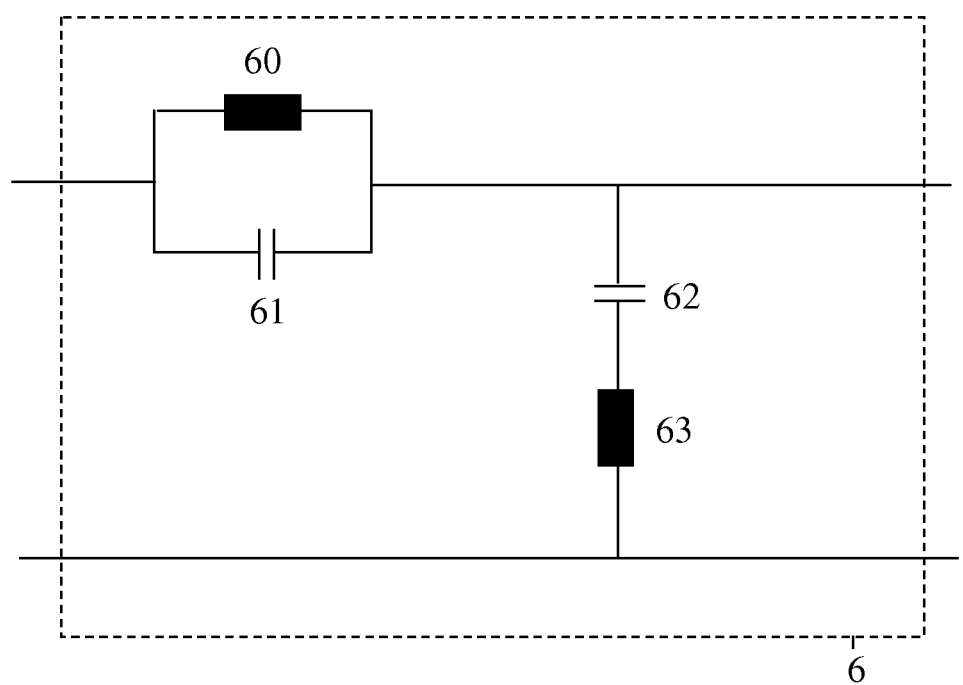
FIG. 4 shows an output part of the switching part.

In the FIG. 4, the output part 6 is shown in greater detail. The output part comprises a notch filter consisting of a parallel circuit of an inductor 60 and a capacitor 61. One side of the parallel circuit is coupled to the other sides of the diodes 56 and 59, and the other side is coupled to one side of a serial circuit of a capacitor 62 and an inductor 63. The other side of the serial circuit is coupled to the other terminal of the secondary winding 51. The other sides of both circuits form output terminals of the converter 1 and are to be coupled to the light source 8.

Figure 5:
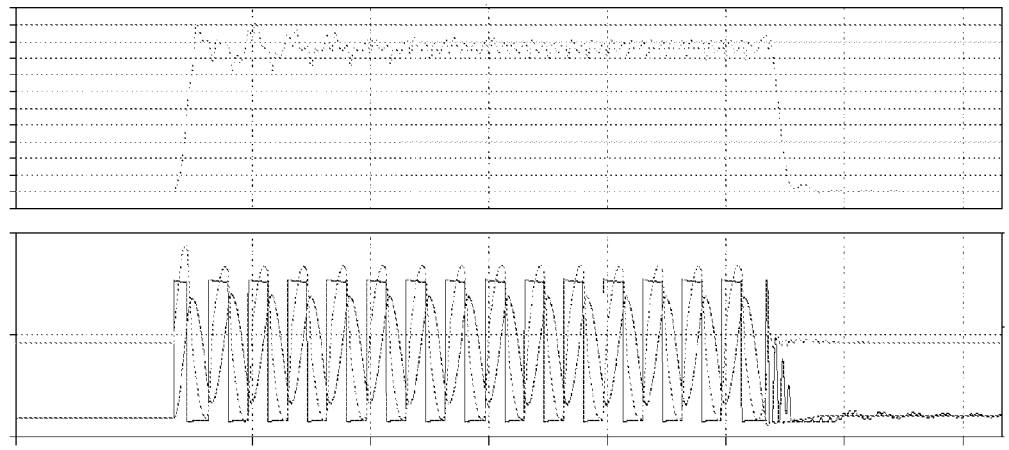
FIG. 5 shows first converter signals.

In the FIG. 5, first converter signals are shown when using the notch filter. In the upper graph, an output voltage of a pulse of the pulsed power is shown. In the lower graph, a larger sine corresponds with a primary side converter current, a smaller sine corresponds with a resonant capacitor voltage, and a relatively rectangular signal corresponds with a primary side converter voltage. During a first time interval of a cycle the first switch 41 is in a first mode and the second switch 42 is in a second mode, in which case the relatively rectangular signal will be "logical one" (higher voltage or upper input node voltage). During a second time interval of the cycle the first switch 41 is in the second mode and the second switch 42 is in the first mode, in which case the relatively rectangular signal will be "logical zero" (lower voltage or lower input node voltage). A group of cycles results in a pulse of the pulsed power, as shown in the upper graph in FIG. 5. The capacitor 48 is called a resonant capacitor.

Figure 6:
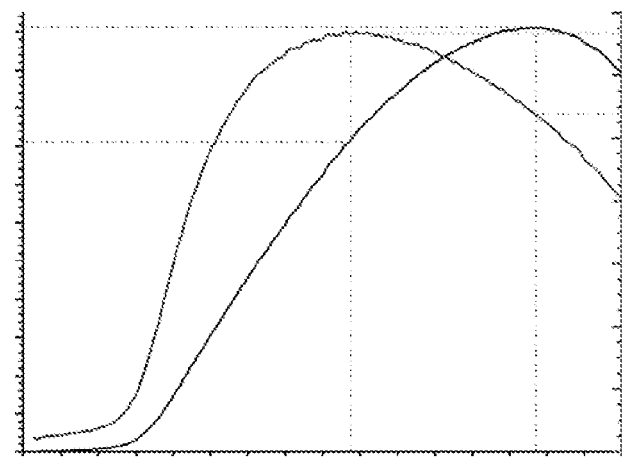
FIG. 6 shows measurement results.

In the FIG. 6, measurement results are shown for a Vertical Cavity Surface Emitting LASER array. The horizontal axis defines current values. The left vertical axis defines an optical power, and the more right graph shows the optical power per current value. The right vertical axis defines an efficiency, and the more left graph shows the efficiency per current value.

Figure 7:
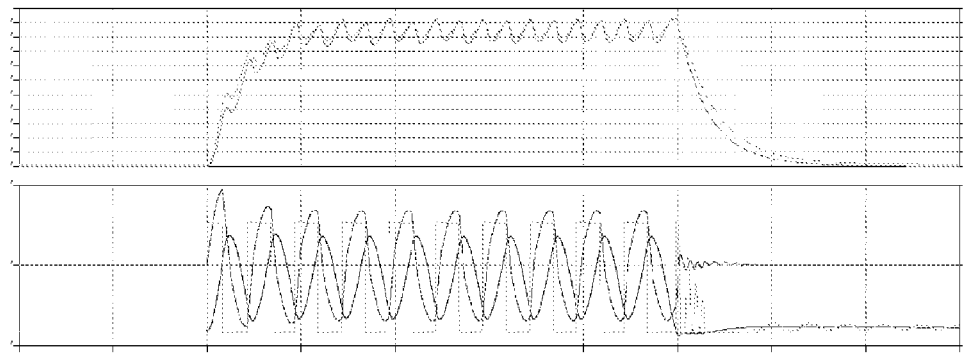
FIG. 7 shows second converter signals.

In the FIG. 7, second converter signals are shown optimized for a smooth settling. In the upper graph, an output voltage of a pulse of the pulsed power (bit larger signal) and an output power of the pulse (bit smaller signal) are shown. In the lower graph, a larger sine corresponds with a primary side converter current, a smaller sine corresponds with a resonant capacitor voltage, and a relatively rectangular signal corresponds with a primary side converter voltage.

Figure 8:
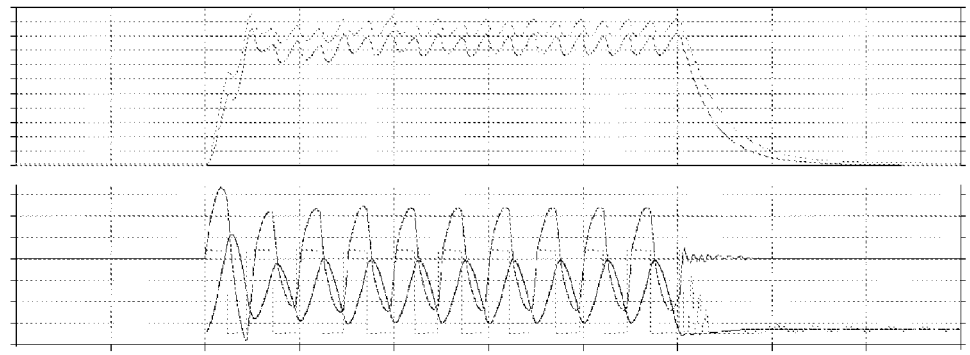
FIG. 8 shows third converter signals.

In the FIG. 8, third converter signals are shown optimized for a fast rise time. In the upper graph, an output voltage of a pulse of the pulsed power (bit larger signal) and an output power of the pulse (bit smaller signal) are shown. In the lower graph, a larger sine corresponds with a primary side converter current, a smaller sine corresponds with a resonant capacitor voltage, and a relatively rectangular signal corresponds with a primary side converter voltage.

Figure 9:
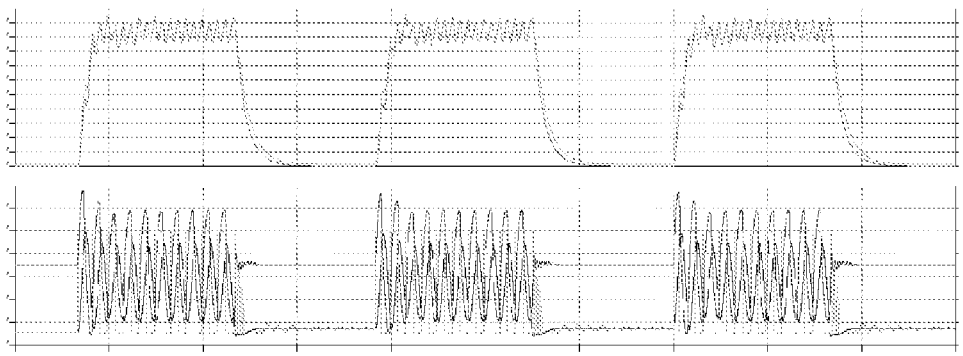
FIG. 9 shows fourth converter signals.

In the FIG. 9, fourth converter signals are shown, a sequence of three power pulses. In the upper graph, an output voltage of a pulse of the pulsed power (bit larger signal) and an output power of the pulse (bit smaller signal) are shown. In the lower graph, a larger sine corresponds with a primary side converter current, a smaller sine corresponds with a resonant capacitor voltage, and a relatively rectangular signal corresponds with a primary side converter voltage.

The resonant converter (converter 1) is of the LLCC-V type. But most other resonant topologies might be used as well. This particular LLCC-V type comprises a transformer with a primary winding coupled to a series resonant capacitor (capacitor 48) and with two secondary windings coupled to each other. The resonant converter is fed with a square wave voltage generated from a DC voltage source (source 7) by a half-bridge circuit comprising switches 41 and 42. At the secondary side the AC voltage is rectified via a rectifier comprising diodes 56 and 59 and filtered via a capacitor (capacitor 64). This rectified and filtered output voltage can be supplied directly to the light source 8.

The stored energy in the filtering capacitor is the main reason for limited pulse transient speed, especially at the end of the pulse. Thus the value of this filtering capacitor should be minimized. Reduction can be achieved either by accepting a higher output ripple (see FIG. 7-9) or introducing a following filter having a higher order. A higher order or resonant output filter can be designed to obtain acceptable ripple with minimal stored energy. This design can be rather critical, but enables very fast rise time at the cost of some overshoot and less regular ripple (see FIG. 5).

In case pulses are to be generated with a resonant converter, there may need to be a number of complete cycles in each pulse. Then it is not possible to directly use conventional PWM schemes, where the duration of the power pulse is modified arbitrarily. In contrast to this, the off periods can have any time duration. For that reason, first of all it is of course possible to have a fixed pulse length and applying PFM modulation. But for most applications the pulse frequency must be in a certain range, or at least above some minimal value. As it is not useful to make more pulses then needed, the best way is to combine both, thereby keeping the pulse frequency close to a required one, selecting the next best fitting pulse duration and fine tuning to a correct on/off ratio by adapting an off period.

According to an embodiment comprising a feed-forward modification of one or more first cycles for optimization of pulse roll on, timing modifications of the first two or three switches are introduced to allow shaping the way the converter enters the steady state. Via these modifications it is possible to set a fast settling of resonant operation and a fast rise of output voltage. The first time interval may be shortened to such extend that the voltage in the resonant capacitor immediately settles to its stationary peak. The following time interval may be slightly extended to optimize the current amplitude close to its correct value. With such a design the converter operation is optimal, but pulse rise time may be a bit slowly. By introducing only a slightly reduced first time interval, the resonant converter current is driven to a higher peak and a higher resonant capacitance voltage is allowed. In this way the positive slope of the output can be increased at the cost of less smooth settling and higher peak currents. The following one or two switches may need to be tuned to adjust output pulse overshoot. In other words, according to this embodiment, the controlling part 3 may shorten the first time interval of the first cycle of the group of cycles and may lengthen the second time interval of the first cycle.

According to an embodiment comprising a modification (feed-forward or conditional) of a last switching cycle to return to an initial state, the last actively controlled time interval is modified. By lengthening or shortening this time interval, a return to the initial conditions can be achieved, contrary to a prior art case where the resonant converter's switching is stopped and all switches are left in an open state, such that a current flow drops to zero and the charge in the resonant capacitor remains at an undefined level. This level should be defined well for a good starting transition of the next pulse. If the converter is just stopped, this is not ensured. The FIG. 9 shows three pulses with a return to a capacitor voltage close to zero between them. Depending on load and pulse specification it might also be useful to modify the last two time intervals. In other words, according to this embodiment, the controlling part 3 may lengthen or shorten the second time interval of the last cycle. After the last actively controlled time interval there may be another commutation to the upper voltage level, which is driven by the resonant current in the converter. In other words, the converter may generate a peak signal during a third time interval following the last cycle, which third time interval is shorter than the shortened first time interval.

Figure 10:
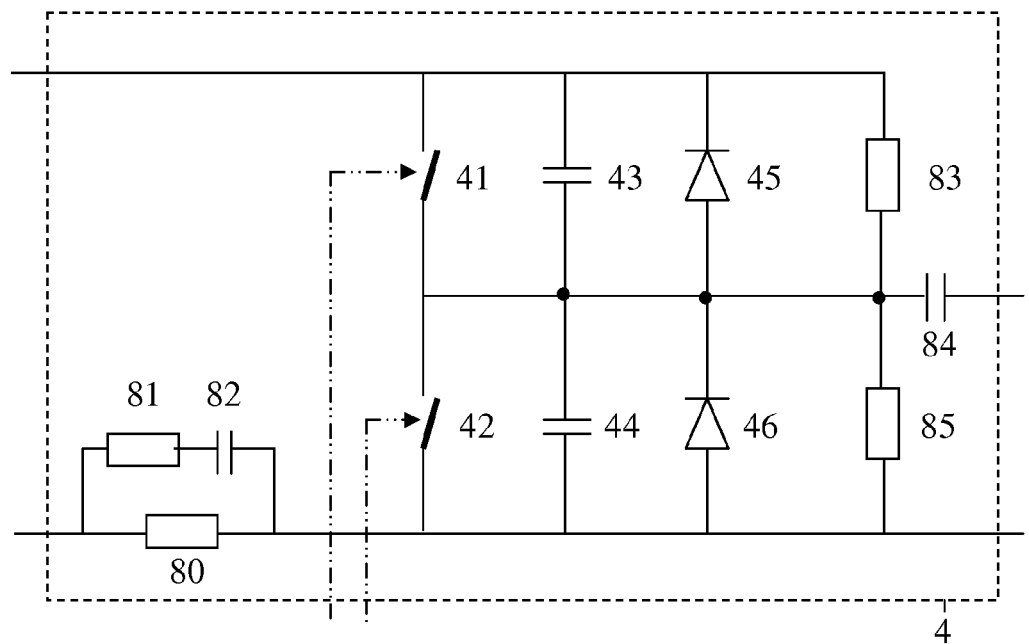
FIG. 10 shows a further input part of the switching part.

In the FIG. 10, a further input part is shown in greater detail. A positive terminal of the source 7 is coupled to a first main electrode of a first switch 41 and one side of a capacitor 43, a diode 45 and a resistor 83. A second main electrode of the first switch 41 is coupled to a first main electrode of a second switch 42 and to the other side of the capacitor 43, the diode 45 and the resistor 83 and to one side of a capacitor 44, a diode 46, a resistor 85 and a capacitor 84. This input part 4 further comprises a resistor 80 connected in parallel to a serial circuit of a resistor 81 and a capacitor 82 and coupled between a negative terminal of the source 7 and a second main electrode of the second switch 42 and the other side of the capacitor 44, the diode 46 and the resistor 85. The other sides of the capacitor 84 and the resistor 85 are to be coupled to the transforming part 5. The serial circuit of the resistor 81 and the capacitor 82 filters high frequency noise, and a current can be measured by using a voltage across the capacitor 82.

Figure 11:
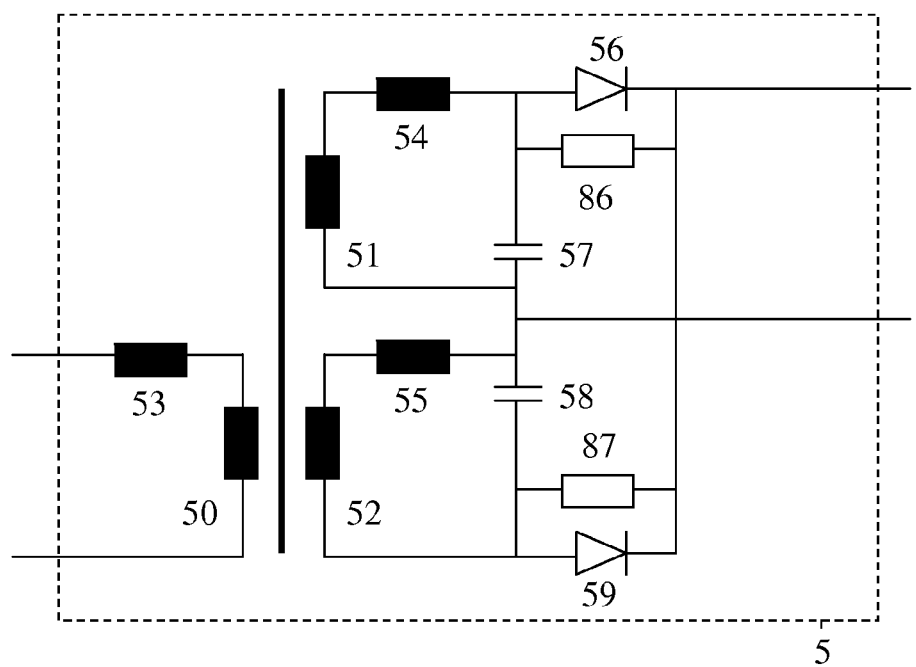
FIG. 11 shows a further transforming part of the switching part.

In the FIG. 11, a further transforming part is shown in greater detail. This transforming part 5 only differs from the one shown in the FIG. 3 in that the diode 56 is connected in parallel to a resistor 86, in that the diode 59 is connected in parallel to a resistor 87, and in that the capacitor 64 has been left out. The resistors 86 and 87 may be left out or may each be replaced by a capacitor or a serial circuit of a resistor and a capacitor.

Figure 12:
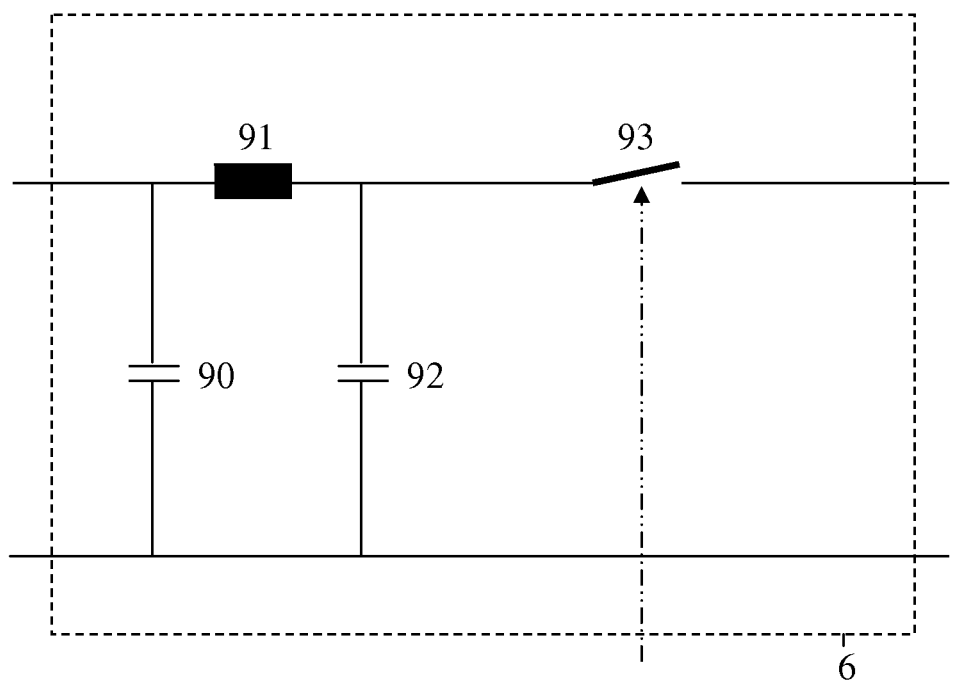
FIG. 12 shows a further output part of the switching part.

In the FIG. 12, a further output part is shown in greater detail. This output part 6 comprises a capacitor 90 coupled in parallel to the transforming part 5 and a serial circuit of an inductor 91 and a capacitor 92 coupled in parallel to the capacitor 90. One side of the capacitor 92 is to be coupled to the light source 8 and the other side of the capacitor 92 is to be coupled to the light source 8 via a switch 93 for switching the light source 8.

According to a simple embodiment, in the FIG. 10-12, the switches 41, 42 and 93 may be MOSFETs, whereby elements 43-46 and 80-83 and 85-87 and 91-92 can be left out.

Figure 13:
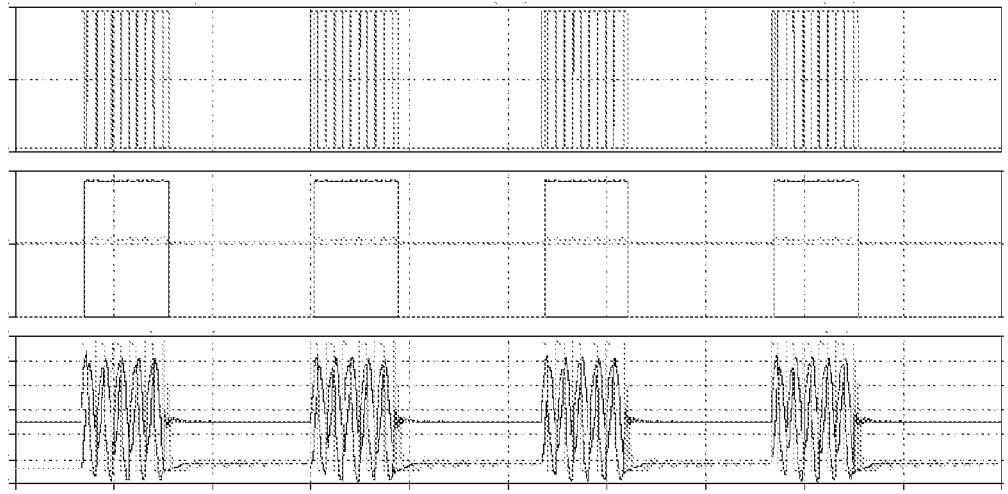
FIG. 13 shows fifth converter signals.

In the FIG. 13, fifth converter signals are shown, whereby one power pulse comprises five cycles.

Figure 14:
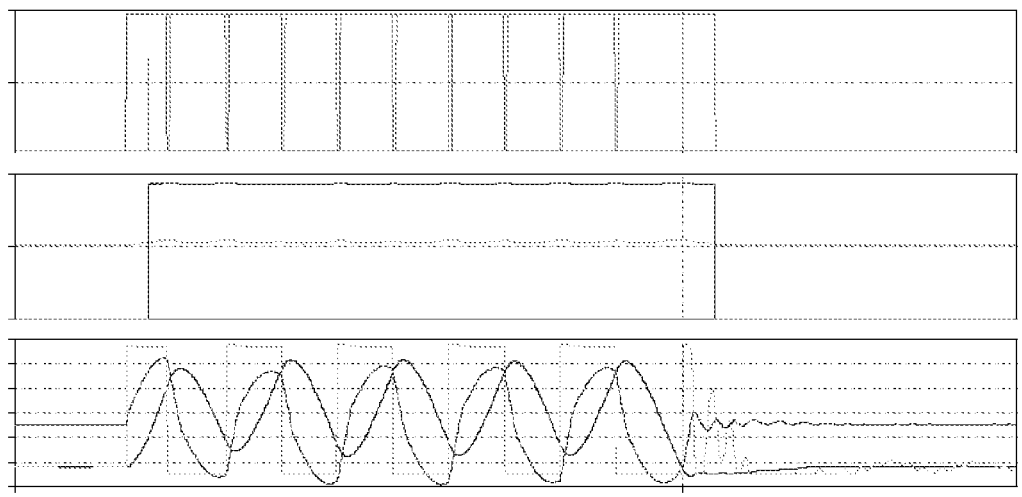
FIG. 14 shows sixth converter signals.

In the FIG. 14, sixth converter signals are shown, corresponding with the fifth converter signals but in greater detail.

When comparing the FIG. 5+FIG. 7-9 on the one hand and the FIG. 13-14 on the other hand, clearly the transient response has been improved. Thereto, the switching part 2 has been provided with the switch 93 for switching at least one of first and second output terminals of the converter 1. The controlling part 3 controls this switch 93 such that the switch 93 is being brought into the first mode (an activation mode such as a conducting mode) at a first moment in time, which first moment in time is situated at a first delay from a start of the first cycle. This first delay is for example a bit smaller than or equal to or a bit larger than the first time interval and may be smaller than a duration of a cycle or not. The controlling part 3 further controls this switch 93 such that the switch 93 is being brought into the second mode (a de-activation mode such as a non-conducting mode) at a second moment in time, which second moment in time is situated at the second delay from an end of a last cycle of the group of cycles. This second delay is for example a bit smaller than or equal to or a bit larger than the first time interval and usually smaller than a duration of a cycle.

The controlling part 3 may comprise a controller for controlling the switches 41, 42 and 93. Alternatively, the controlling part 3 may comprise a detector for controlling the switch 93 in response to a detection of a voltage signal of the converter 1. This voltage signal may for example be detected across the capacitor 92 or, in case the capacitor 92 has been left out, across the capacitor 90, all shown in the FIG. 12, or across the capacitor 64 shown in the FIG. 3 etc.

Figure 15:
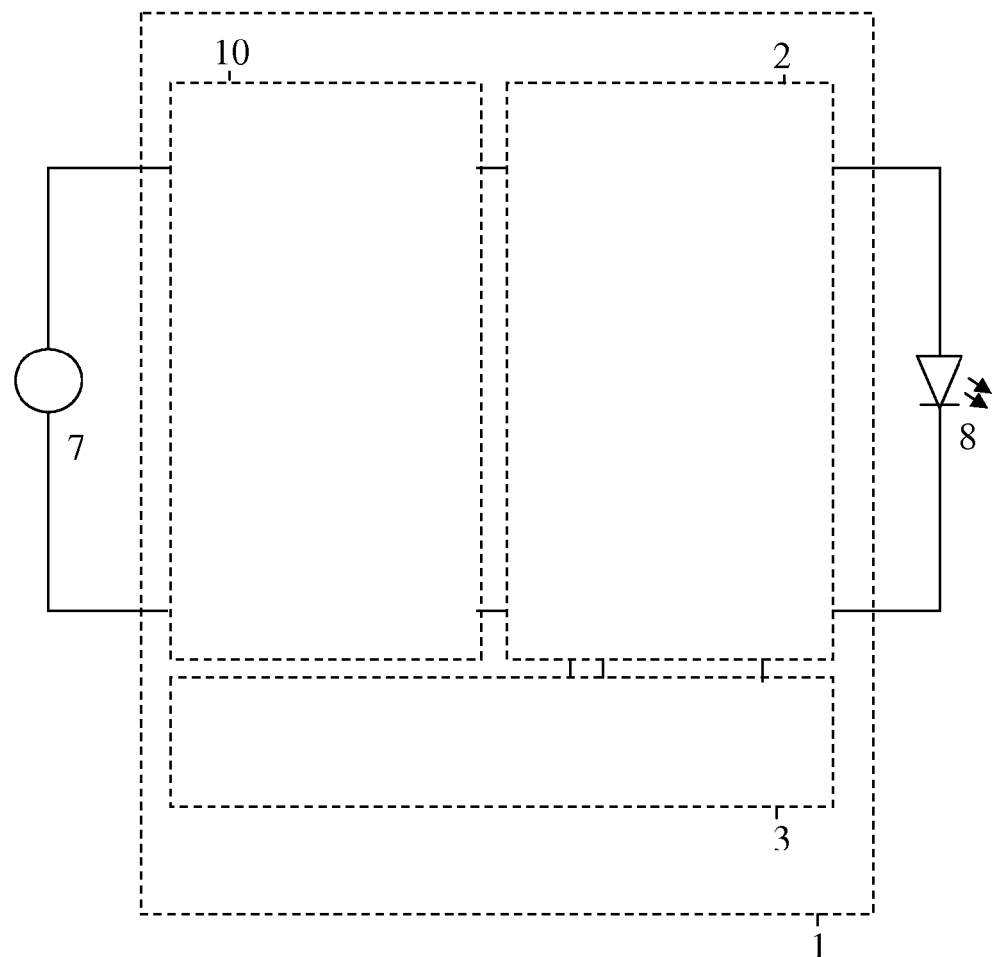
FIG. 15 shows a further converter, the further converter comprising a pre-conditioning part, a switching part and a controlling part.

In the FIG. 15, a further converter is shown. This converter 1 only differs from the one shown in the FIG. 1 in that a pre-conditioning part 10 has been inserted between the source 7 and the switching part 3.

Figure 16:
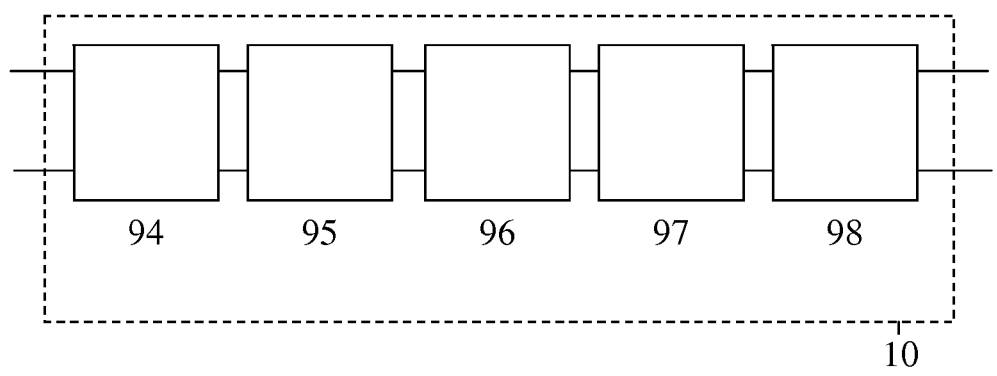
FIG. 16 shows the pre-conditioning part in greater detail.

In the FIG. 16, the pre-conditioning part 10 is shown in greater detail. This pre-conditioning part 10 comprises from left to right a filter 94 for filtering high frequencies and/or common mode current, a rectifier 95, a power factor controller 96, a storage unit 97 and a filter 98 for filtering high frequencies.

Figure 17:
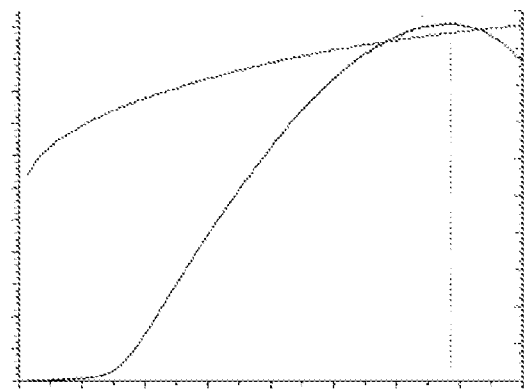
FIG. 17 shows data of a Vertical Cavity Surface Emitting LASER array.

In the FIG. 17, data of a Vertical Cavity Surface Emitting LASER array is shown. The horizontal axis defines current values. The left vertical axis defines an optical power, and the mostly lower graph shows the optical power per current value. The right vertical axis defines voltage values, and the mostly upper graph shows the voltage value per current value.

Figure 18:
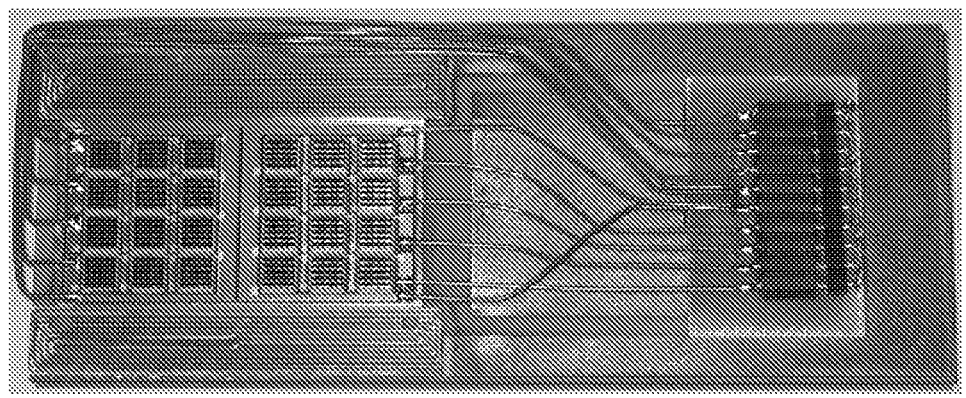
FIG. 18 shows the Vertical Cavity Surface Emitting LASER array.

In the FIG. 18, the Vertical Cavity Surface Emitting LASER array is shown. The output power is 600 W. The array is designed to have strings of seventy-five units in series, of which eight are connected in parallel.

Figure 19:
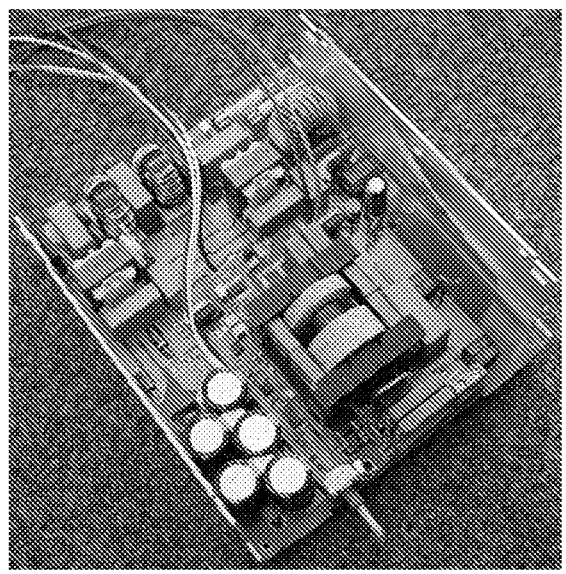
FIG. 19 shows a driver.

In the FIG. 19, a driver is shown. This driver may drive for example a LASER load or a LED load.

Figure 20:
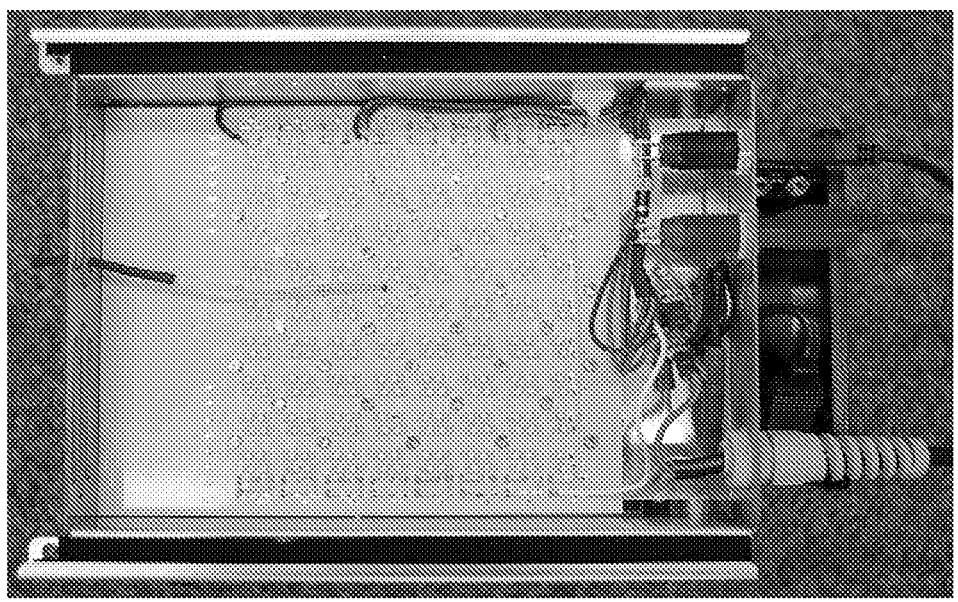
FIG. 20 shows a Light Emitting Diode array.

In the FIG. 20, a Light Emitting Diode array is shown. This LED array uses five strings in parallel each of fifty-four LEDs in series that can be operated without further current control resistors or circuitry.

In the FIGS. 3 and 11, the diodes 56 and 59 may each or together be replaced by a rectifying circuit that for example comprises a rectifier bridge.

About the FIG. 15-20, it is noted that series connections of LEDs/LASERs may be used to achieve an operation voltage level of 100 . . . 400V, and parallel connections of several series connections or strings may be used to obtain a correct power level. The LEDs/LASERs may be interleaved on a cooling interface to avoid differences in current share. A parallel connection may be introduced without additional current sharing components.

The supply of the series/parallel connected LEDs/LASERs may be realized through a resonant type power converter, e.g. LC, LCC, LLC, LLCC etc. The converter output may be directly connected to the LED/LASER load (no current sensing or current control).

A power converter control may be used for constant power output, enabled by indirect measurements obtained on a primary side. A so called "charge mode control" may be used to obtain a measure for the current, and/or a shunt resistor on the primary side may be used, and/or measures already acquired in another stage of the power converter (e.g. in the pre-conditioner) may be used.

A false condition detection & protection may be derived from indirect measurements such as short circuit detection by detecting a measured input power becoming nearly zero, and/or from load failures (too high or to low load voltages)

to be detected by measuring an input power lying outside an expected range (the expected range may depend on a converter input voltage and an actual switching frequency, e.g. taken from a look up table).

Summarizing, converters 1 for supplying pulsed power to light sources 8 comprise switching parts 2 and controlling parts 3 for adapting switching parameters of the switching parts 2 for improving a performance. The switching part 2 may comprise first/second switches 41, 42 that are in first/second modes during a first time interval of a cycle and vice versa during a second time intervals of a cycle. A group of cycles results in a pulse of the pulsed power. A switching parameter such as the first time interval of a first cycle may be shortened to reduce overshoot. A switching parameter such as the second time interval of the first cycle may be shortened or lengthened. A switching parameter such as the second time interval of a last cycle may be lengthened or shortened to reduce overshoot. A third switch 93 for switching the light source 8 is activated and de-activated delayedly to improve transient behavior.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A converter for supplying pulsed power to a light source, the converter comprising
    a switching pan and
    a controlling part for controlling the switching part, the controlling part being configured for adapting a switching parameter of the switching pan to at least one of reduce overshoot of the pulse of pulsed power and to improve transient behavior of the converter,
    the switching part comprising first and second mode and the second switching being the first mode during a time interval of the cycle, a group of cycles resulting in a pulse of the pulsed power.

2. The converter as claimed in claim 1, the switching parameter comprising the first time interval of the first cycle of the group of cycles, and said adapting comprising shortening the first time interval of the first cycle.

3. The converter as claimed in claim 2, the switching parameter further comprising the second time interval of the first cycle of the group of cycles, and said adapting, further comprising shortening or lengthening the second time interval of the first cycle.

4. The converter as claimed in claim 1, the switching parameter comprising the second time interval of the last cycle of the group of cycles, and said adapting further comprising, lengthening or shortening the second time interval of the last cycle.

5. The converter as claimed in claim 4, the converter generating a peak signal during a third time interval following the last cycle, which third time interval is shorter than the shortened first time interval.

6. The converter as claimed in claim 1, the first switch comprising a first main electrode coupled to a first input terminal of the converter, the second switch comprising a first main electrode coupled to a second main electrode of the first switch, the second switch comprising a second main electrode coupled to a second input terminal of the converter, control electrodes of the first and second switches being coupled to the controlling part, the first and second main electrodes of one of the switches being coupled to first and second terminals of a primary winding of a transformer, a first terminal of a secondary winding of the transformer being coupled to a first output terminal of the converter, a second terminal of the secondary winding being coupled to a second output terminal of the converter, a first terminal of a further secondary winding of the transformer being coupled to the second output terminal, and a second terminal of the further secondary winding being coupled to the first output terminal.

7. The converter as claimed in claim 1, the converter comprising a filter coupled to first and second output terminals of the converter.

8. The converter as claimed in claim 1, the switching part further comprising a third switch for switching at least one of first and second output terminals of the converter, the switching parameter comprising a first moment in time, the third switch being brought into the first mode at the first moment in time, which first moment in time is situated at a first delay from a start of the first cycle, the switching parameter further comprising a second moment in time, the third switch being brought into the second mode at the second moment in time, which second moment in time is situated at a second delay from an end of a last cycle of the group of cycles.

9. The converter as claimed in claim 8, the controlling part comprising a controller for controlling the first and second and third switches.

10. The converter as claimed in claim 8, the controlling part comprising a detector for controlling the third switch in response to a detection of a voltage signal of the converter.

11. A converter for supplying pulsed power to a light source, the converter comprising
    a switching part and
    a controlling part for controlling the switching part, the controlling part being configured for adapting a switching parameter of the switching part to at least one of reduce overshoot of the pulse of the pulsed power and to improve transient behavior of the converter, the controlling part providing a constant power output via measurements obtained at a primary side of the converter.

12. A converter for supplying pulsed power to a light source, the converter comprising,
    a switching part and
    a controlling, part for controlling the switching part, the controlling part being configured for adapting a switching parameter of the switching part to at least one of reduce overshoot of the pulse of the pulsed power and to improve transient behavior of the converter,
    the controlling part providing a false condition detection and protection from indirect measurements through a short circuit detection by measuring an input power going to near zero and/or through load failures in the form of too high or too low load voltages by measuring an input power being situated outside an expected range that depends on a converter input voltage and an actual switching frequency.

* * * * *